United States Patent
Rahai

(10) Patent No.: US 12,448,945 B2
(45) Date of Patent: Oct. 21, 2025

(54) OPTIMIZED END PLATES FOR VERTICAL AXIS WIND TURBINE

(71) Applicant: Hamid R. Rahai, Long Beach, CA (US)

(72) Inventor: Hamid R. Rahai, Long Beach, CA (US)

( * ) Notice: Subject to any disclaimer, the term of this patent is extended or adjusted under 35 U.S.C. 154(b) by 139 days.

(21) Appl. No.: 18/231,644

(22) Filed: Aug. 8, 2023

(65) Prior Publication Data

US 2025/0052228 A1 Feb. 13, 2025

(51) Int. Cl.
*F03D 3/06* (2006.01)

(52) U.S. Cl.
CPC ........ *F03D 3/061* (2013.01); *F05B 2240/211* (2013.01); *F05B 2240/304* (2020.08)

(58) Field of Classification Search
CPC ................................. F03D 3/005; F03D 3/061
See application file for complete search history.

(56) References Cited

U.S. PATENT DOCUMENTS

2021/0095637 A1* 4/2021 Ito ........................... F21S 9/035

FOREIGN PATENT DOCUMENTS

CN 203476602 * 3/2014

OTHER PUBLICATIONS

Machine translation of CN 203476602.*

* cited by examiner

*Primary Examiner* — Brian O Peters
(74) *Attorney, Agent, or Firm* — Fulwider Patton LLP

(57) ABSTRACT

The performance of airfoils on wind turbines has been found to be improved by the presence of endplates mounted to the airfoil. Using steady numerical simulations, the shape of the endplates that improves the lift coefficients and lift-to-drag coefficients to the greatest degree is a thin plate that follows the chord of the airfoil with a thickness that is between an eighth and a quarter of the length of the airfoil. Rounding the edges of the endplates further enhance the performance of the airfoil, and the overall effect of the endplates achieves nearly a 9.1% increase and 30% decrease in the lift and drag forces, respectively.

6 Claims, 2 Drawing Sheets

OPTIMIZED END PLATES FOR VERTICAL AXIS WIND TURBINE

BACKGROUND

Vertical axis wind turbines (VAWTs) are a type of wind turbine where the main rotor shaft is arranged vertically, as opposed to the more common horizontal axis wind turbines (HAWTs) where the rotor axis is horizontal. VAWTs come in a variety of designs, including Savonius, Darrieus, and Giromill, each with its unique features and advantages. Savonius VAWTs have a simple design, consisting of two or more curved blades that are shaped like half of an S-shape. They are often used for small-scale applications, such as powering small electronics or pumping water. One of the advantages of VAWTs is that they can capture wind from any direction, as they are not dependent on the wind direction. This makes them well-suited for urban or suburban areas where wind patterns may be unpredictable. They also have a lower noise level than HAWTs, making them a good option for residential areas. However, VAWTs generally have lower efficiency than HAWTs and are not as widely used in commercial applications. They also require more frequent maintenance due to their more complex design. Despite these drawbacks, VAWTs remain a promising technology for small-scale renewable energy generation, especially in areas where space is limited and wind patterns are unpredictable.

The flow characteristics around a VAWT at a high rate of rotation have some similarities with a spinning cylinder. Previous investigations on spinning cylinders and Magnus effects have shown increased lift coefficient with increased velocity ratio (the ratio of peripheral velocity to free-stream velocity) and the effects of approaching unsteady flow on the cylinder's oscillation result in changes in the cylinder's wake and drag coefficient. The wind turbine performance can be improved when it is placed near a surface. The effects of a slanted wall (rooftop) on the performance of single and double wind turbines have been found to improve the wind tunnel performance when the turbines are placed at 25% of the length from the pick rooftop and at 1-2 diameter distance from the roof surface in the vertical direction. For the wind panel consisting of two wind turbines, with the downstream wind turbine positioned at 1-D in both vertical and horizontal directions from the axis of the upstream wind turbine, the results have shown improvements in the combined power output when compared with the corresponding power of individual rooftop turbines.

SUMMARY OF THE INVENTION

The present inventor has performed numerical shape optimization followed by experimental verifications to obtain an optimized airfoil for the development of a high-performance vertical axis wind turbine (U.S. Pat. No. 7,393,177, the contents of which are incorporated herein by reference). This optimized airfoil demonstrated a greater than 15% increase in the maximum power coefficient as compared with that of the Benesh airfoil at the wind velocity of 6.8 m/sec. Significant gains in the torque coefficient have been obtained at all speeds for the tip speed ratios higher than 1.0 for this optimized airfoil. The maximum power coefficient for the optimized airfoil was over 0.42 at the mean velocities of 6.8 m/s and 9.75 m/s, and about 0.38 at the mean velocity of 8.0 m/s.

For the wind tunnel tests, a VAWT using the optimized airfoil was developed with circular end plates and sharp leading edges that enclosed the optimized airfoils. The testing shows a maximum lift coefficient of 0.79 at 15 degrees AOA and decreases with increasing AOA. The additional contribution of the lift to the torque diminishes at AOA higher than 25 AOA.

The present invention was borne of those tests and it was discovered that replacing the circular endplates with the endplates of the present invention demonstrated unexpectedly effective improvements in the characteristics of the VAWTs under most conditions. The effects of the endplates that follow the airfoil chord shape has an important effect on the performance of the high-efficiency VAWT with the optimized airfoil.

The addition of the end plates of the present invention respectively increases and decreases the lift and drag forces with 12.7 cm width end-plates being the most impactful, resulting in a nearly 9.1% increase and over 30% decrease in the lift and drag forces respectively as compared with the corresponding results for the baseline model with no end-plates. For 1.27 cm width end-plates, the average increase and decrease in respectively lift and drag forces were 5.7% and less than 1% and when the 7.62 cm width end-plates were used these values were 8.2% and over 24%. For all models, there were no significant increases in lift force beyond 40 degrees AOA.

DETAILED DESCRIPTION OF THE PREFERRED EMBODIMENTS

Nomenclature

AoA Angle of attack
D Drag Force (N)
L Lift Force (N)
L/D Lift-to-Drag Ratio
$\rho$ Density (kg/m3)
c Chord Length (m)
S Wing Reference Area (m2)
Axial Mean Velocity (m/s)
Vertical Mean Velocity (m/s)
Transverse Mean Velocity (m/s)
u' Axial Turbulent Velocity (m/s).
v' Vertical Turbulent Velocity (m/s)
w' Transverse Turbulent Velocity (m/s)
$U_\infty$ Free Stream Velocity
W Airfoil Width (m)
$\mu$ Dynamic Viscosity (N-s/m$^2$)
$\nu$ Kinematic Viscosity (m$^2$/s)
CD Drag Coefficient, CD=2D/$\rho$u2S
Cl Lift Coefficient, CL=2 L/$\mu$u2S
Re Reynold's Number, Re=U(0)c/$\nu$
Reynolds averaged Navier-Stokes equations with all y+ wall model and the Spalart-Allmaras turbulence model were used with the Ansys CCM+ software for all the simulations.

The free-stream mean velocity was 10 m/sec and the Reynolds number based on the airfoil chord length (C) of 30.48 cm and standard air properties was $2\times10^5$. The computational domain dimensions were 30C×30C×10C and a 32-core high-performance computing was used for the simulations.

Figure 1:
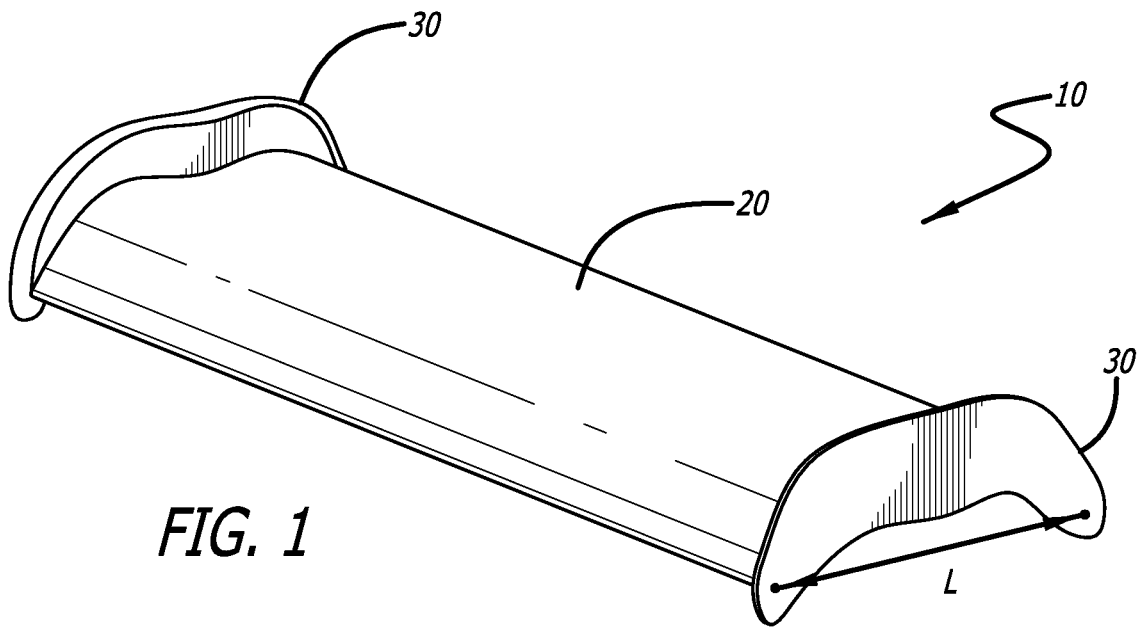
FIG. 1 is an elevated, perspective view of an optimized airfoil and endplates forming part of a vertical axis wind turbine.

FIG. 1 shows an airfoil assembly that served as the subject of a computational mesh. An overset grid technique (moving mesh) was used around the airfoil for changing the AOA. A hybrid mesh with an unstructured polyhedral grid away from the airfoil and a structured 15 layers hexahedral grid enclosing the airfoil was used. The minimum prism layer near the airfoil surface was 10-5 cm and away from the airfoil was 2-3 cm. These values were arrived at after mesh refinements at zero AOA which was then updated with changing AOA. The background cell count was over 7.7 million and the overset cell count varied from 20 million to 90 million. The overset mesh count was based on a mesh independence study with the baseline model lift and drag coefficients as variables with a convergence rate parameter of 10-3 decimal places between two iterative values.

The variation of the lift and drag coefficients for the baseline model at different AOA was investigated. The drag coefficient is 0.12 at zero degrees AOA with sharp increases to 0.67 at 20 degrees AOA. The rate of increase is reduced between 20 and 30 degrees AOA and then a higher rate of increase beyond the 40 degrees AOA to a maximum value of 1.46 at 90 degrees AOA. At 90 degrees AOA, the drag coefficient is nearly the same as the published value for a vertical flat plate.

The lift coefficient is 0.25 at zero degrees AOA, increasing to a maximum of 1.9 at 20 degrees AOA before it decreases continuously to zero at 90 degrees AOA. Previous numerical optimization has indicated significant contributions of lift to torque for up to 30 degrees AOA which are in agreement with these results.

Contours of mean velocity and pressure at the mid-section plane at 20 degrees AOA for all cases studied showed that the 20 degrees corresponded to the maximum lift coefficient. For the baseline model, flow accelerates on the top for nearly a quarter of the airfoil chord, and decelerates over the flat region where a wide and shallow dent exists, before it separates at the tail. There is a flow roll-up in the separated region before it dissipated in the wake.

With the 1.27 cm end plates, recirculating flow is generated near the flow separation point with another one with a wider area extending into the wake. When the end-plate width increases to 7.62 cm, there is a clear sign of an organized oscillatory motion, shedding fluid into the wake. With increased width to 12.7 cm, the oscillatory motion has disappeared and a large recirculating region is developed which is extended into the wake.

When the end plates are added to the airfoil, they limit the spanwise flow, increasing axial momentum for a higher lift. The pressure surface regions experience reduced flow which remains nearly the same for all cases. The behavior of the pressure contours is opposite to the velocity contours with low pressure on the top and high pressure below the airfoil. With added end-plates, the wake experiences regions of low pressure which corresponds to those of recirculating flows.

The contours of the turbulence kinetic energy (TKE) and vorticity for the baseline model and those with endplates of various widths at 20 degrees AOA show that for all models, TKE is high near the leading edge and is reduced downstream. In a separated flow region, TKE is zero. TKE is increased in the near wake and around the oscillatory flow for the model with 7.62 cm end-plates. Along the mid-section plane, there are two areas of high vorticity for the baseline model. One belongs to regions 1 and 2 and the other belongs to region 3 with a split in between. Downstream in the wake, there are also two regions of high vorticity associated with the recirculation regions.

With the 1.27 cm end-plate, the two regions of high vorticity extends to the wake and encompass the isolated high vorticity regions observed in the baseline model. With the 7.62 cm end-plate the wake becomes unstable and displays Karmen-type vortex shedding and with the 12.7 cm end-plate, the vortex shedding has disappeared and there are two distinct regions of high vorticity, similar to the 1.27 cm end-plate but with a higher extension into the wake. The vortex shedding for the airfoil with a 7.62 cm end plate could be due to periodic vortex dislocations from the junction between the end plates and the airfoil. Studies on the vortex shedding from a step cylinder have shown similar characteristics with vortex dislocations from the large cylinder to the small cylinder with the shedding frequency being influenced by the cylinders' diameter ratio. Reducing the diameter ratio reduces the frequency. The dislocation was distinct for a certain length to the large diameter ratio, L/D. It is believed that this distinct shedding is related to the ratio of the end plate to the airfoil widths which merits future ongoing investigations. For the baseline model, vortices are high at the tip-ends and symmetric. With the added 1.27 cm width end-plates, vortices are reduced and become slightly asymmetric. Significant changes in the vortices generated at the end plates with increased widths. With the added end plates, the surface area upstream of the wing's leading edge is limited and the boundary layer is not fully developed, the wing is a slender body with a very small leading edge diameter, and thus the skew-induced secondary flow is not expected to be present. However, the corner flow induces: the stress-induced secondary flow which increases mixing with the external flow, resulting in the diffusion of vortices in the wake.

For the model with 12.7 cm width end plates, the end vortices are strong and nearly symmetric.

Further testing shows variations of lift and drag coefficients and lift-to-drag ratio with AOA for all cases studied. The end plates result in increased lift beyond 10 degrees AOA. The peak lift is observed at 20 degrees AOA with models with 7.62 cm and 12.7 cm displaying high lift. The lift decreases at higher AOA although the models with higher end-plate width still display a higher lift. The lift is zero at 90 degrees AOA. It should be noted here that increasing the width from 7.62 cm to 12.7 cm results in less than 4% increase in the lift coefficient and thus we do not anticipate a significant additional increase in lift with increasing the width beyond 12.7 cm.

It was revealed that the drag is increased with increasing AOA. Between 10-20 degrees AOA, the models with higher end plates experienced lower drag as compared with the corresponding values for the baseline model and the one with 1.27 cm width end plates. At these AOA, with higher end-plate widths, the axial momentum is increased and area 2 is more effective in reducing the overall drag of the airfoil. At 40 degrees AOA, the models with larger end plates display a higher overall drag which could be due to the oscillatory flow and increased wake width.

The lift-to-drag ratio increases with added end-plates beyond 10 degrees AOA with the highest associated with the model with 12.7 cm end-plate width. For the largest end-plate width, the ratio is nearly constant between 10-20 degrees AOA. There is no change in the lift-to-drag ratio at and beyond 40 degrees AOA. The ratio is zero at 90 degrees AOA and the airfoil behaves as a drag machine at this AOA. The addition of the end plates thus reduces the induced drag and yields a higher lift to drag ratio.

Figure 2:
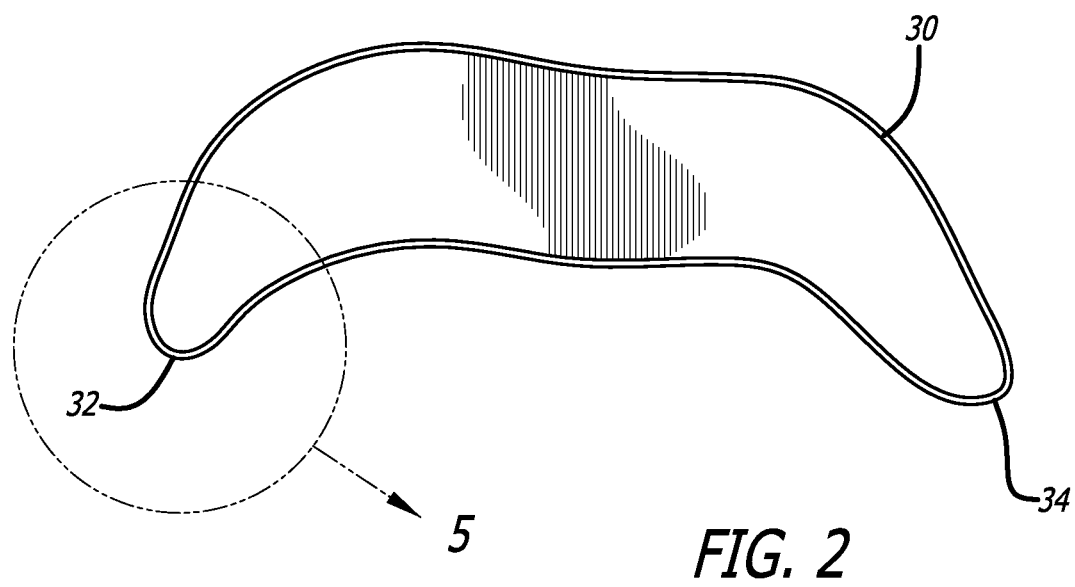
FIG. 2 is a plan view of a first embodiment of an end plate of the present invention.
Figure 3:
FIG. 3 is a front view of the end plate of FIG. 2.
Figure 4:
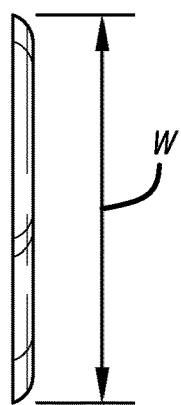
FIG. 4 is a side view of the end plate of FIG. 2.
Figure 5:
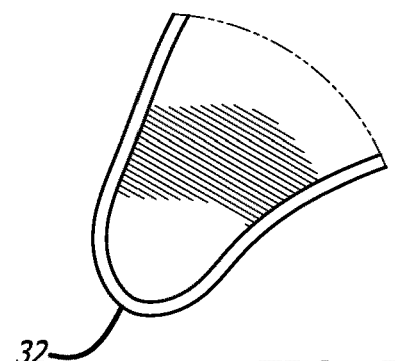
FIG. 5 is an enlarged top view of the portion of the end plate of FIG. 2.
Figure 6:
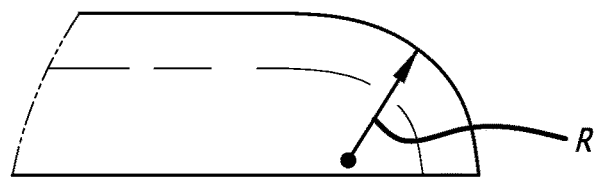
FIG. 6 is an enlarged edge view of the end plate of FIG. 6

FIG. 1 shows an airfoil assembly 10 such as would be used on a VAWT with an airfoil 20 having a tip-to-tip length L, the airfoil characterized by that described in U.S. Pat. No. 7,393,177, bounded by a pair of endplates 30. FIG. 2 shows the planform view of a first embodiment of an endplate 30 having a leading edge 32 and a trailing edge 34, both of a convex configuration but of different contours as shown. The endplate 30 as shown in FIG. 3 is of a constant thickness T save a rounded fillet 36 or radius R around the perimeter of the endplate 30. FIG. 4 shows the side view of the endplate 30 having a Width of W. The values of L, W, T, and R for a first embodiment are 30.48 cm, 14.66 cm, 0.76 cm, and 0.76 cm, respectively. The offset from the chord of the airfoil in the intermediate sections of the endplate, away from the leading edge and the trailing edge, is preferably between 0.125 L and 0.21 L, corresponding to a 7.62 cm and 12.7 cm for a 30.48 cm chord length.

The effects of end-plates of various widths on flow characteristics and lift and drag coefficients of a high-efficiency airfoil used for the development of a vertical-axis wind turbine with a high power coefficient have been numerically investigated. The end plates are offset from the chord in both directions and follow the airfoil shape at 1.27 cm, 7.62 cm, and 12.7 cm widths. The freestream mean velocity was 10 m/sec. which corresponds to a Reynolds number based on the airfoil chord of $2.0 \times 10^5$. The angle of attack was changed from 0 to 90 degrees. Results indicate the added end-plate results in increased lift and lift-to-drag ratio with the results being more pronounced for the model with the largest end-plates. The highest lift and lift-to-drag ratio was observed at 20 degrees AOA with the lift coefficients being at 2.7, 2.8, 3.34, and 3.47 for respectively no end plates, and 1.27, 7.62, and 12.7 cm width end plates respectively. The added lift is due to increased axial momentum on the lift-generating surface. The added lift should result in increased torque and power coefficient.

While certain preferred embodiments of the invention have been described and depicted above, the present invention is not limited to only those embodiments described herein. A person of ordinary skill in the art would readily recognize certain modifications and substitutions to the versions of the embodiments, and the invention's scope is intended to include all such modifications and substitutions. Accordingly, the scope of the invention is properly determined by the words of the appended claims using their customary and ordinary meanings, consistent with but not limited by the foregoing descriptions and depictions.

I claim:

1. A wind turbine airfoil assembly, comprising:
   an asymmetric airfoil having a length L, said asymmetric airfoil having an upper surface and a lower surface, said upper surface defining a shape including a camber portion at a leading edge region, a concave portion at an intermediate region, and a convex portion at a trailing edge; and
   first and second asymmetrical end plates disposed at opposite ends of the airfoil, the end plates each having a contour following the shape of the asymmetric airfoil wherein a first edge of the end plates between the leading edge and trailing edge includes a concave portion between two convex portions, and a second edge of the end plates between the leading edge and trailing edge includes a convex portion between two concave portions.

2. The wind turbine airfoil assembly of claim 1, wherein a thickness of the first and second end plates is approximately 0.0125 L.

3. The wind turbine airfoil assembly of claim 1, wherein a width of the end plates is approximately 0.48 L.

4. The wind turbine airfoil assembly of claim 1, wherein the end plates have a convex leading edge and a convex trailing edge.

5. The wind turbine airfoil assembly of claim 4, wherein the convex leading edge has a contour that is different from a contour of the convex trailing edge.

6. The wind turbine airfoil assembly of claim 1, wherein the rounded fillet is constant around a perimeter of the endplates.

* * * * *